June 4, 1929.　　　　S. SMITH　　　　1,716,330
AUTOMOBILE SUN SHIELD
Filed Dec. 8, 1927.　　　2 Sheets-Sheet 1

INVENTOR
Sheffield Smith
BY
Horatio E. Bellows
ATTORNEY

June 4, 1929. S. SMITH 1,716,330
AUTOMOBILE SUN SHIELD
Filed Dec. 8, 1927   2 Sheets-Sheet 2

INVENTOR
Sheffield Smith
BY
Horatio E. Bellows
ATTORNEY

Patented June 4, 1929.

1,716,330

UNITED STATES PATENT OFFICE.

SHEFFIELD SMITH, OF NORTH PROVIDENCE, RHODE ISLAND.

AUTOMOBILE SUN SHIELD.

Application filed December 8, 1927. Serial No. 238,556.

My invention relates to detachable shields for use upon automobiles for protecting the occupants and particularly the driver from rain, snow and sun.

The essential objects of my invention has for its primary purposes, in addition to those commonly sought, the complete exclusion of rain and snow; facility of attachment and detachment; compactness; cheapness; and strength.

My invention consists, therefore, in the means and mechanism for performing the results above specified, and falling within the scope of the claim appended hereto.

Figure 1:
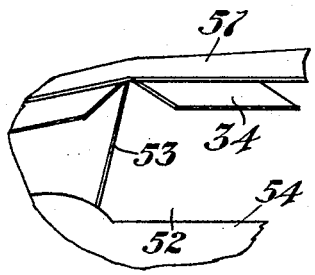
Figure 2:
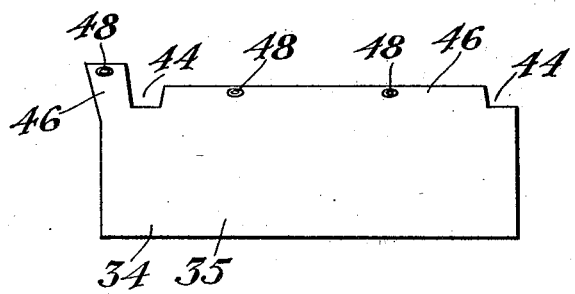
Figure 3:
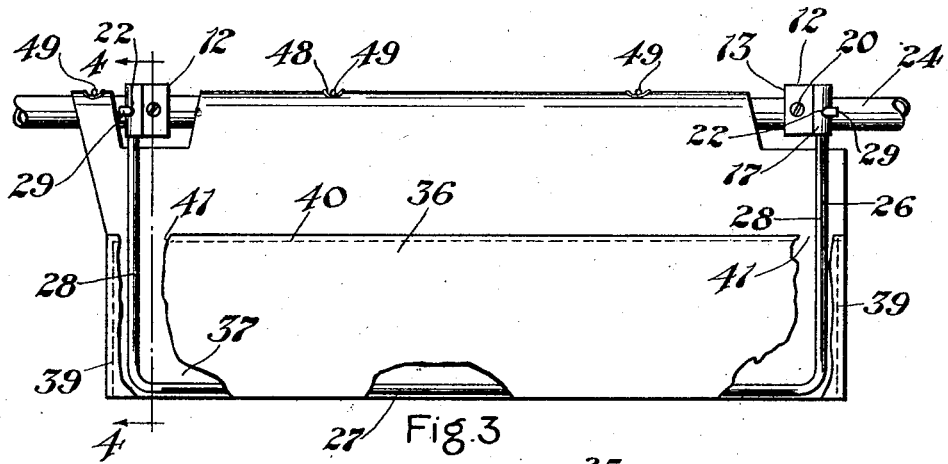
Figure 4:
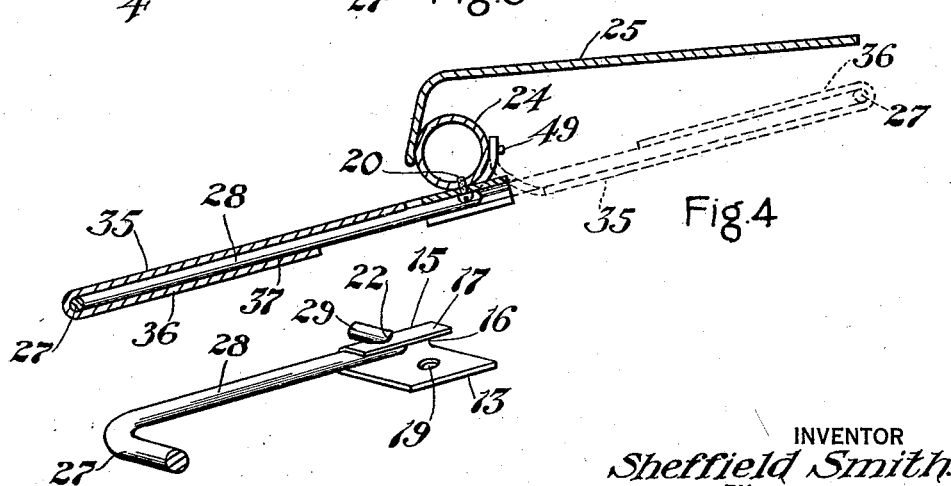
Figure 5:
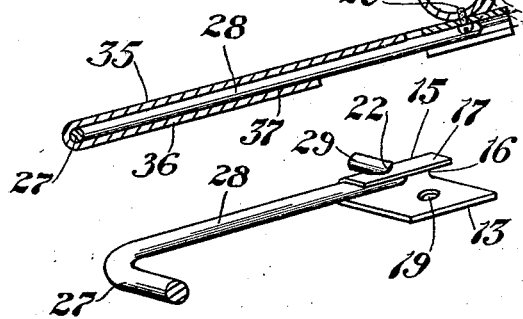
Figure 6:
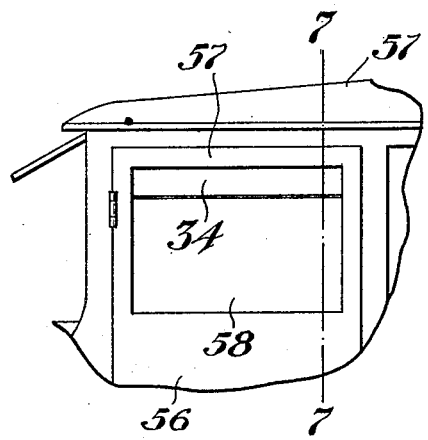
Figure 7:
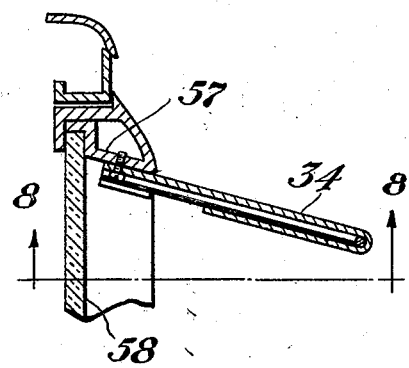
Figure 8:
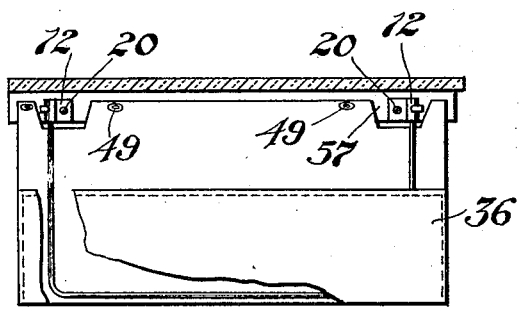

In the accompanying drawings wherein like reference characters indicate like parts throughout the views, Figure 1 is a fragmentary perspective view of an open automobile equipped with my novel device, Figure 2, a plan of the shield cover, Figure 3, a bottom plan of the shield, with parts shown broken away, Figure 4, a section of the shield, the adjacent portion of the automobile body taken on line 4—4 of Figure 3, Figure 5, a fragmentary perspective of an attaching plate and the supporting member, Figure 6, a fragmentary side view of a closed automobile embodying my invention, Figure 7, a section taken on line 7—7 of Figure 6, and Figure 8, a section taken on line 8—8 of Figure 7.

As herein shown my invention includes a pair of attaching plates 12 stamped and bent up from thin material. As they are identical with each other a description of one will serve for both. Each consists of a substantially rectangular body 13 provided with a transversely curved lateral flange 15 comprising a curved portion 16 adjacent the body, and a resilient lip portion 17 parallel with the body 13. The body 13 has a centrally located perforation 19 to accommodate an attaching screw 20. The flange portion 16 has a centrally located hole 22 to receive a supporting member. The attaching screws enter the upper portion of the automobile body. In Figures 3 and 4 they are shown engaged in the lower face of one of the bows or rods 24 of the top 25 of an automobile body. The plates 12 are located above the side openings of the automobile body. They are connected by a detachable support 26.

The support is formed from a wire or rod and is in the form of a substantially rectangular loop comprising a horizontal intermediate portion 27 and resilient legs 28 disposed at right angles thereto, terminating in laterally extending fingers 29. The legs register in the concave grooves 16 of the flanges 15, so that they are overlapped by the tongues 17. It will be observed that by compressing the legs the fingers 29 are withdrawn from their holes 22 and the member 26 may be completedly detached from its supports.

A shield cover 34 is provided, and is composed of any preferred flexible fabric, either textile or leather, or a combination of both. This comprises a body strip 35 of substantially oblong shape longitudinally folded to afford the wall 36 of a pocket 37 upon the under face of the cover. The lateral edges of the pocket and the major portion of the inner edge of the pocket wall are provided with rows of stitches 39 and 40 respectively. The stitching 40 is interrupted near its ends, as at 41, to admit the legs of the support 26 whose portion 27 is the bottom of the pocket 37. The upper edge of the body 35 has spaced recesses 44 to accommodate the members 12, and these form flat portions 46. In the upper flap margins are grummet openings 48 or the like to receive buttons or other engaging projections 49 upon the rod 24.

In Figure 1 my shield is shown in active position below the automobile top 51, above the side opening 52, and adjacent a corner brace 53. The body of the automobile is indicated in a general manner by 54. In Figure 4 the full lines indicate the active position of my shade, and the broken lines, the inactive position thereof after it has been manually swinging in the path of a semicircle. In this operation the lip portions 17 of the flanges at first yield until the legs 38 of the support escape therefrom, and after the latter have moved about 180 degrees they snap into their seats below the flanges again where they are securely held. This movement does not detach the members 49 from their openings 48.

If it is desired to completely detach the shield and fold it up for storage the legs are manually compressed to disengage the fingers 29 from their bearings and the flaps 46 are detached from the projections 49.

In Figures 6 to 8 inclusive my shield is shown attached to a closed automobile. In this case the door 46 is provided with the usual window casing 57 with its disappearing window pane 58. In this instance the members 12 are attached to the under face of the casing 57 above the window opening, and the buttons or studs 49 are also located thereon. When the shield is thus attached the window may be either open or closed. If closed, as shown in Figure 7, the window pane need merely be lowered in the usual manner to permit the shade to swing inwardly.

I claim:—

In combination, a longitudinal top member, a resilient U-shaped awning frame, means for securing the ends of the U-member, to said top member, said means comprising hook-shaped clips spaced apart and with the open ends opposite each other, whereby the resilient ends of said frame may be sprung toward each other to disengage them from said clips and the frame be swung to an inoperative position and reengaged with the clips.

In testimony whereof I have affixed my signature.

SHEFFIELD SMITH.